Sept. 10, 1957   H. T. THUNANDER   2,806,122
TEMPERATURE RESPONSIVE DEVICE
Filed Feb. 3, 1954   3 Sheets-Sheet 1
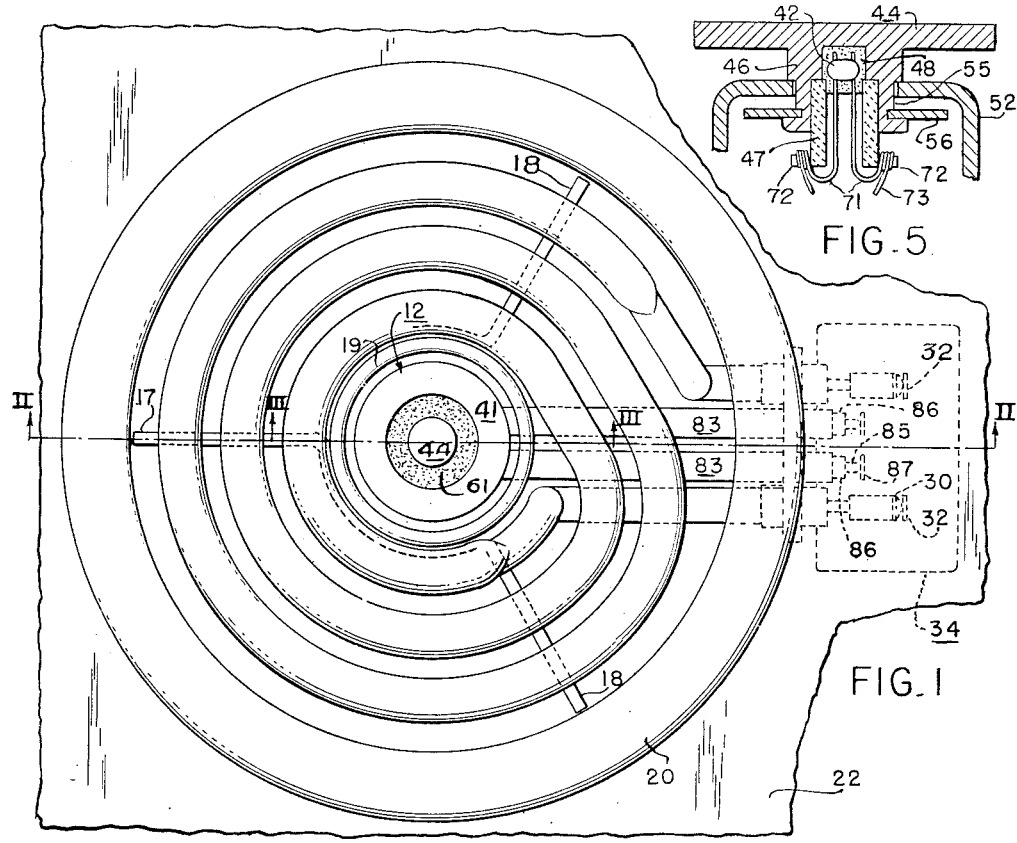
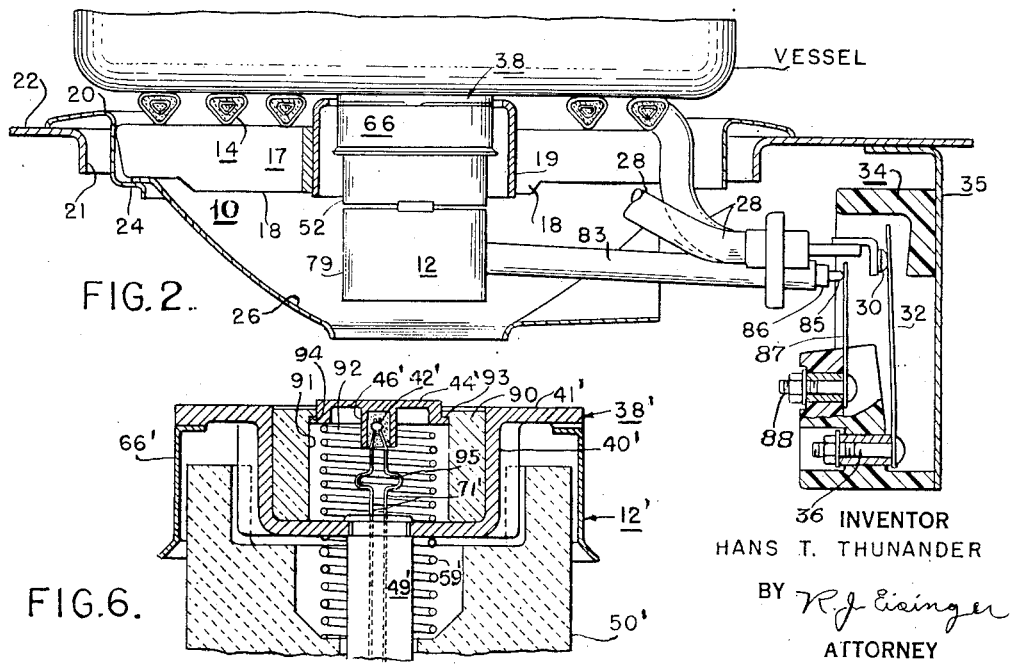
INVENTOR
HANS T. THUNANDER
BY R. J. Eisinger
ATTORNEY Sept. 10, 1957  H. T. THUNANDER  2,806,122
TEMPERATURE RESPONSIVE DEVICE
Filed Feb. 3, 1954  3 Sheets-Sheet 2

INVENTOR
HANS T. THUNANDER
BY R. J. Eisinger
ATTORNEY

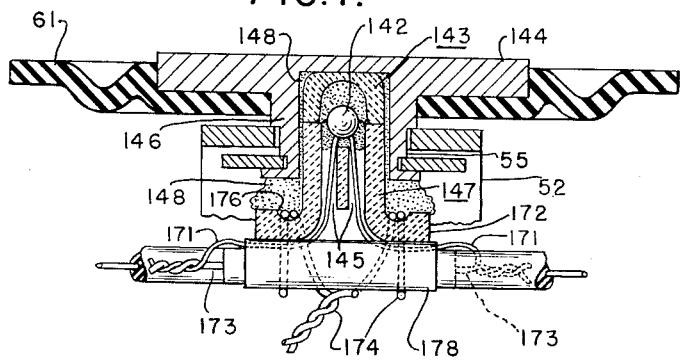
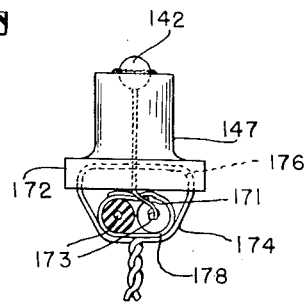
FIG. 7.
FIG. 9.
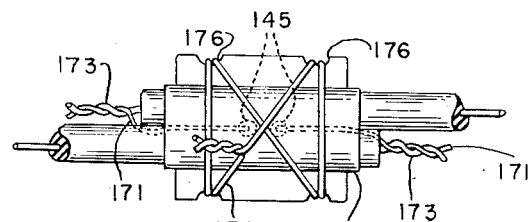
FIG. 8.
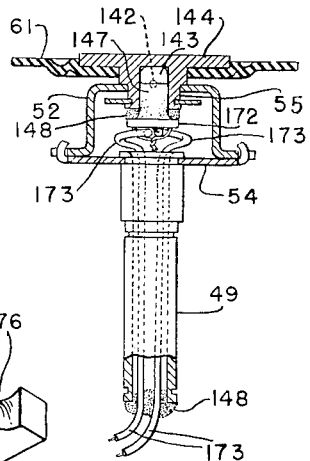
FIG. 11.
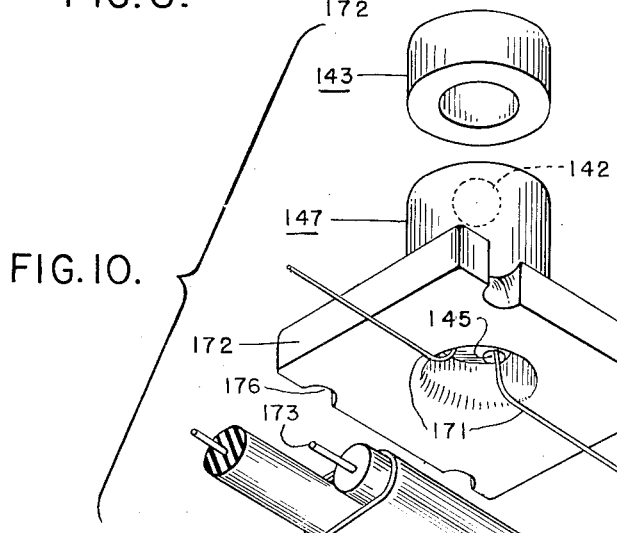
FIG. 10.
INVENTOR
HANS T. THUNANDER
BY R. J. Eisinger
ATTORNEY United States Patent Office 2,806,122
Patented Sept. 10, 1957

2,806,122

TEMPERATURE RESPONSIVE DEVICE

Hans T. Thunander, Mansfield, Ohio, assignor to Westinghouse Electric Corporation, East Pittsburgh, Pa., a corporation of Pennsylvania Application February 3, 1954, Serial No. 407,918

13 Claims. (Cl. 219—37)

This application is a continuation-in-part of Hans T. Thunander application, Serial No. 335,061, filed February 4, 1953, now abandoned, and retaining to a Temperature Responsive Device.

This invention relates to a temperature-responsive device for controlling an electrical circuit, more particularly to a temperature-responsive device for an electric surface cooking unit.

The most difficult and also most critical problem in a temperature-responsive device incorporated in a surface cooking unit is elimination of the effect of stray heat from the heating unit on the temperature-sensitive element.

It is an object of the invention to provide a temperature-responsive device for a surface unit in which the temperature-sensitive element is effectively shielded from stray heat emitted by the surface unit.

It is a further object of the invention to provide a device of the above type in which the temperature-sensitive element will closely follow the temperature of a cooking vessel being heated by said heating unit.

It is a still further object of the invention to provide a device of the above type in which the temperature-sensitive element is effectively protected against spillage and entrance of other foreign matter.

It is another object of the invention to provide a device of the above type having a heat shield of simple form, yet entirely adequate to divert stray heat, emitted by the heating unit, away from the temperature-sensitive element.

Another object of this invention is to provide a support for accuratly positioning a temperature-sensitive electrical element during assembly of a temperature-responsive device, and for insuring good electrical insulation between this element and all electrically conducting parts of the temperature-responsive device.

Another object of this invention is to provide, in a temperature-responsive device, a temperature-sensitive element having very fine electrical leads and means for supporting the connections between said leads and heavier lead wires, wherein no flexing of the fine wires or stressing of the connections between the fine wires and the lead wires occurs during normal linear and tilting movement of the temperature-sensitive element.

In a proposed prior construction, a temperature-sensitive element, for example, a resistor whose resistance is variable with temperature, is disposed at the center of an annularly shaped surface cooking unit and adapted to contact a vessel placed thereupon. During a cooking operation, the resistor is heated and closely follows the temperature of the vessel. The resistor is electrically connected in a circuit controlling the cooking unit and as the temperature of the vessel varies, the resistance of the resistor changes and controls the circuit.

In accordance with the present invention, the temperature variable resistor is attached to a metal disc which is centrally disposed in a cup-shaped heat shield. The shield is disposed in the center of an annularly shaped surface cooking unit, and is provided with a tubular wall portion for intercepting stray heat from the unit which would otherwise be absorbed by the resistor. The shield is further provided with an annular flange which is of substantial surface area and integral with the tubular wall portion.

The disc is considerably smaller than the shield and is disposed in spaced relation to the tubular wall portion of the shield. A further feature of the invention resides in the provision of an annular heat insulating member bridging the annular space between the disc and the top of the shield. This member serves to protect the resistor against spillage and also to isolate it from the shield.

The disc is movable relative to the shield, and the flange and the disc are arranged to make good contact with a vessel placed on the cooking unit. The shield and the disc are made of metal having good heat conducting properties. Thus, a good thermal path is provided, whereby the stray heat is not restrained, but instead, is continuously and readily transmitted to the relatively cool vessel through the shield. With this arrangement, the temperature of the ambient surrounding the resistor is prevented from rising to undesirably high values, even during long cooking periods.

The above and other objects are effected by the invention as will be apparent from the following description taken in connection with the accompanying drawings, forming a part of this application, in which:

Fig. 1 is a plan showing my invention incorporated in an electric surface cooking unit;

Fig. 2 is a vertical section taken substantially along line II—II of Fig. 1, with some parts shown in elevation;

Fig. 5 is an enlarged fragmentary sectional view, showing the mounting arrangement of the temperature-sensitive element;

Fig. 6 is a fragmentary vertical section showing another embodiment of the invention;

Fig. 7 is a fragmentary vertical section of a third embodiment of my invention, enlarged many times and showing those portions which differ from the first embodiment;

Fig. 8 is a bottom view of a subassembly of the embodiment shown in Fig. 7;

Fig. 9 is a side elevation of the same subassembly of the third embodiment shown in Fig. 8;

Fig. 10 is an exploded perspective view showing several components of the third embodiment of this invention before they are assembled in their relationship indicated in Fig. 7; and Fig. 11 is a vertical section of a subassembly of the third embodiment taken at right angles to the vertical section of Fig. 7 and showing additional structure.

Figure 3:
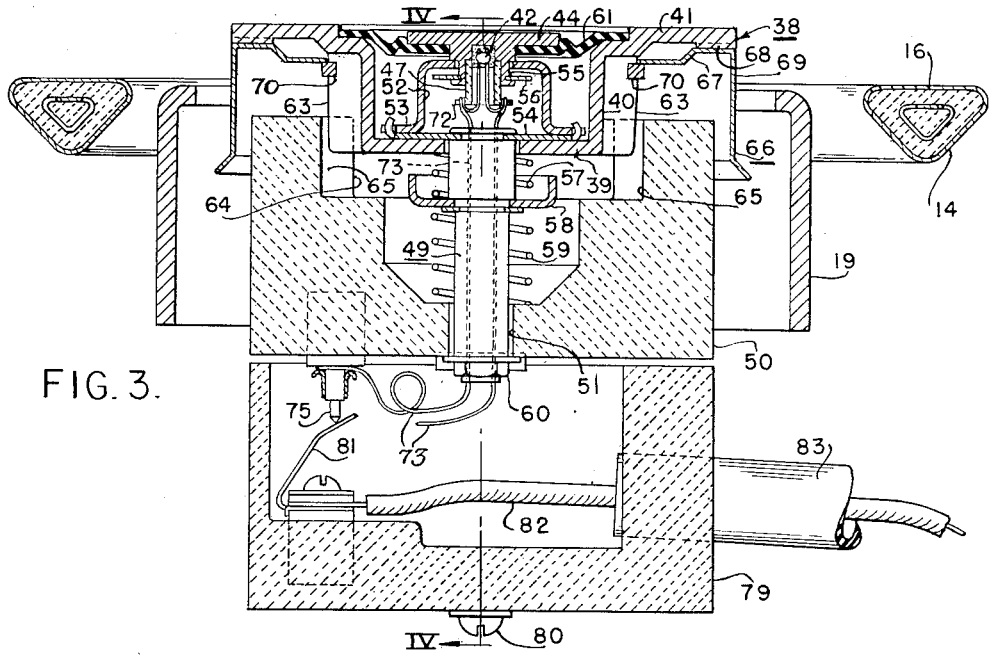
Fig. 3 is a fragmentary vertical section taken on line III—III of Fig. 1 and showing, on a larger scale, the temperature-responsive device in one position.

Referring to the drawings in detail, especially Figs. 1 and 2, there is shown an electric surface heating unit 10 having a temperature-responsive device, generally designated 12, supported therein in a central position.

The surface heating unit is provided with a tubular sheathed heater 14 which is wound in a flat spiral to form a flat top surface 16 for supporting a vessel. The heater 14 has an opening at the center in which the temperature-responsive device 12 is received. The heater 14 is supported on a spider 17 having a plurality of legs 18 extending outwardly from a central tubular portion 19.

The tubular portion 19 is disposed with its axis vertical and has its upper edge disposed slightly below the level of the cooking surface 16.

The surface unit further comprises an annular mounting ring 20, which is received in an opening 21 provided in a platform 22 and has an inwardly extending annular flange 24 upon which the spider 17 is supported in the platform 22. If desired, a reflector pan 26 may be disposed below the spider 17 and supported on the flange 24 in nesting relation with the mounting ring 20.

The heater 14 has its terminal portions 28 extended downwardly and outwardly and provided with electrical contacts 30 cooperable with a set of spring contacts 32 disposed within a terminal block 34 made of electrical insulating material. The block 34 may be attached to the underside of the platform 22 in any desired manner, as for example, by a strap 35.

Each of the spring contacts 32 is anchored at its lower end to the terminal block 34 by means of a nut and bolt arrangement 36, which also serves as a connection to a power supply through a control (not shown).

Figure 4:
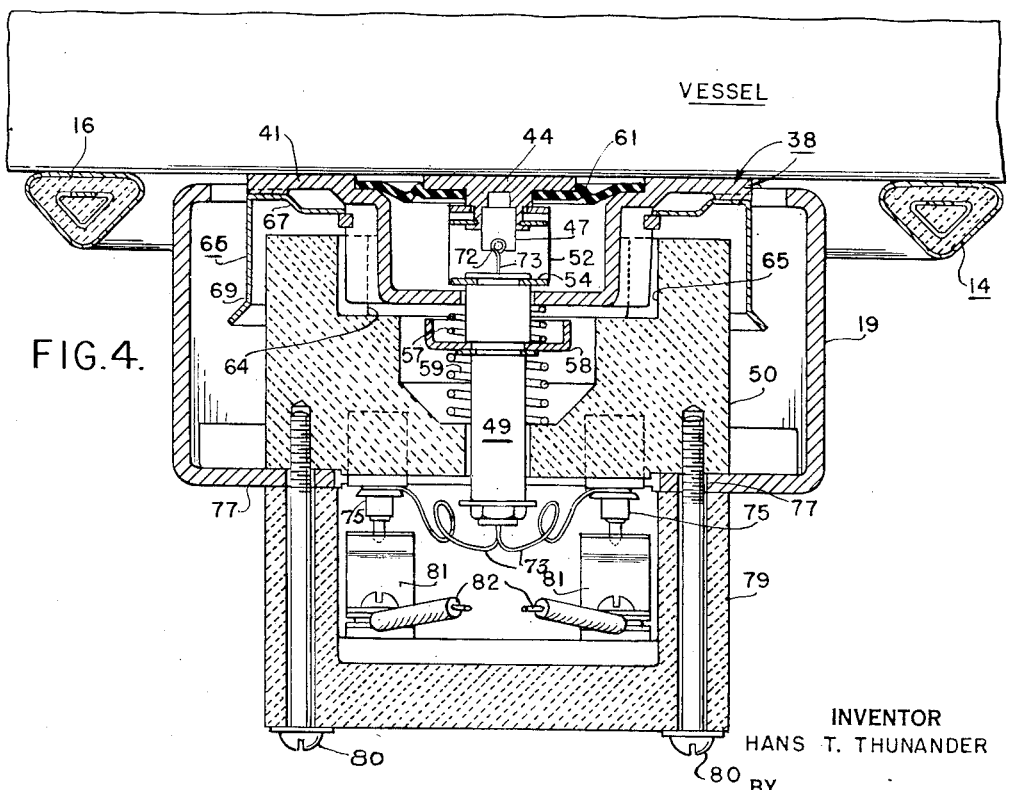
Fig. 4 is a vertical section taken on line IV—IV of Fig. 3, showing the device in the position it assumes when a vessel is placed on the cooking unit.

The temperature-responsive device 12, as best shown in Figs. 3 and 4, includes a cup-shaped heat shield 38 having a bottom wall 39, an upwardly extending tubular wall 40 and an outwardly extending annular flange 41. The shield 38 is made of metal having heat conducting properties at least as good as those of brass, such as copper, aluminum or one of their alloys, and is of ample thickness to permit rapid flow of heat, as will subsequently be described. For example, in the embodiment shown, the thickness of the wall 40 is approximately $\frac{1}{16}$ inch. A temperature-sensitive element, for example, a small resistor 42 whose electrical resistance is variable with temperature, and which is also referred to as a thermistor, is disposed within the confines of the shield 38 and is supported therein by a disc 44, also made of metal having good heat conducting properties. As best shown in Fig. 5, the disc 44 is provided with a tubular wall portion 46 which has received therein a sleeve 47 made of ceramic or the like. The temperature-variable resistor 42 is received in the upper part of the tubular portion 46 and is embedded therein by means of a high temperature resisting cement or paste 48, for example, that paste now sold on the market under the trade name of Silastic.

The shield 38 is mounted on a guide member 49, which is slidably received in an electrical and heat insulating block 50 provided with a central bore 51 of slightly larger diameter than the guide member 49. The disc 44 is also mounted on the guide member 49 by means of a stirrup 52 having its lower ends 53 attached to a plate 54 which, in turn, is rigidly fastened to the upper end of the guide member 49. The disc 44 has its tubular wall portion 46 loosely received in an opening in the stirrup 52 and is held therein by a horseshoe lock washer 56. Thus, although the disc 44 is movable vertically together with the guide member 49 as a unit, it may tilt slightly, when required by the bottom wall of a vessel placed thereon, as will be subsequently explained.

The shield 38 is biased upwardly relatively to the guide member 49 into abutment with the plate 54 by a helical spring 57 encompassing the guide member 49 and confined at its lower end by a cup-shaped washer 58 locked to the guide member. A second spring 59, of heavier wire than spring 57, encompassing the guide member and confined between the washer 58 and the block 50, serves to bias the guide member 49 and thus both the disc 44 and the shield 38 upwardly to a position determined by an adjustment nut 60 mounted on the lower end of the guide member.

As shown in Fig. 3, when no vessel is on the surface unit, the shield 38 is biased upwardly to a position in which the annular flange 41 is well above the cooking surface 16 defined by the tubular heater. Also, the disc 44 is biased upwardly to a position which is slightly below that of the upper surface of the shield 38, for example, about $\frac{1}{32}$ of an inch. The resistor 42 is protected from spillage or other foreign matter by an annular membrane 61 made of any flexible heat insulating material capable of withstanding cooking temperatures, for example, polymerized Silicone rubber. The membrane 61 is cemented or otherwise attached at its inner edges to the lower surfaces of the disc 44 and at its outer edges to the flange 41 of the shield 38 in a manner to prevent entrance of liquid or other foreign matter into the inner confines of the shield. Thus, although the disc 44 is attached to the shield 38 by the membrane 61, the shield is freely movable with respect to the disc, because of the resiliency of the membrane. Also, since the membrane 61 is a heat insulator, heat from the shield is not readily conducted through the membrane to the disc 44, although the shield is attached thereto to form a unitary structure.

As best shown in Figs. 3 and 4, the shield 38 is slidably received within a large central bore 64 in the upper portion of the insulating block 50. The shield is provided with a plurality of vertical guide ribs 63 disposed on the outer surface of the tubular wall 40. The bore 64 is provided with a plurality of vertically disposed recesses 65 within which the guide ribs 63 are slidably received, thereby permitting vertical movement of the shield 38 and also some tilting movement but preventing relative rotation between the shield 38 and the block 50.

A drip sleeve 66 may also be provided to further reduce the possibility of spillage entering the inner confines of the block 50. This sleeve may be provided with an upper annular wall 67 disposed below the flange 41 and spaced therefrom by a plurality of rounded pads 68 provided on the flange, and it is further provided with a depending tubular wall 69 encompassing the insulating block 50. The sleeve 66 may be detachably locked to the heat shield 38 by means of a flexible snap ring engaging a plurality of notches 70 provided in the guide ribs of the shield. The area of contact between the heat shield and the drip sleeve is kept to a minimum value to minimize heat flow from the latter to the former.

The leads 71 of the resistor 42 may be brought out the lower end of the insulating sleeve 47 and wrapped about a pair of ears 72 provided thereon for affording a sturdy connection between the relatively fragile resistor leads 71 and a pair of heavier lead wires 73. The lead wires 73 extend downwardly through the bore of the guide member 49 and may be attached to a pair of stationary contacts 75 supported in the lower portion of the insulating block 50. Any strain or pull on the lead wires 73 is absorbed by the ears 72, thereby protecting the resistor leads from damage.

As best shown in Fig. 4, the insulating block 50 is supported upon a pair of inwardly extending tabs 77 provided in the tubular portion 19 of the spider. A lower cover 79 is attached to the insulating block 50 by means of a pair of screws 80, which extend upwardly through openings provided in the tabs 77 into threaded engagement with the insulating block 50.

The cover 79 has provided therein a pair of spring contacts 81, which are biased into engagement with the stationary contacts 75 when the cover is in place. The spring contacts 81 are connected to a pair of lead wires 82, each of which is received in a tube 83. The tubes 83 are received in an opening in the cover 79 and extend outwardly therefrom in a substantially horizontal direction, spanning the distance between the cover 79 and the terminal block 34, as best shown in Fig. 2. Each of the wires 82 is provided with a contact 85 disposed in insulated relation with the tube 83. The tubes 83 may be sealed at their outer end against the entrance of moisture and other foreign matter by means of insulating bushings 86.

The terminal block 34 is further provided with a pair of spring contact arms 87, each of which is anchored at its lower end by means of a nut and bolt assembly 88 and biased at its upper end into engagement with its associated contact 85.

The sheathed heater 14 and the resistor 42 are electrically connected to a control through the terminal connections 88 and 36. The control may be of the type shown and described in Nagel and Booker patent application, Serial No. 332,234, filed January 21, 1953; hence, it has not been shown and need not be described.

*Operation*

During the cooking operation, the resistor 42, being in good contact with the vessel, will closely follow the temperature of the vessel. As the temperature of the resistor rises, its resistance changes progressively. The control responds to changes in resistance of the resistor to control the circuit through the heater 14. It will be noted that it is essential for the resistor to respond to the temperature of the vessel alone in order that accurate control may be obtained. It must also be noted that any stray heat absorbed by the resistor will raise the temperature of the latter, causing the resistor to convey a false indication to the control.

As mentioned previously, with no vessel on the surface unit 10, the temperature-responsive device 12 is in the position shown in Fig. 3, in which position the upper or vessel contacting surface of the flange 41 of the heat shield is above the vessel supporting surface 16 of the surface heating unit. Also, the upper or vessel contacting surface of the disc 44 is slightly below that of the heat shield 38 but above the surface 16 of the surface unit.

When a vessel is placed on the surface unit, the temperature-responsive device 12 assumes the position shown in Fig. 4. The bottom wall of the vessel is in contact with the cooking surface 16, the flange 41, and the disc 44. The above position is attained as follows: When the vessel is first lowered, the flange 41 is abutted by the vessel and, since the spring 57 is lighter than spring 59, the shield is lowered against the bias of the spring 57 which the disc 44 remains stationary until it is abutted by the vessel. The weight of the vessel then exerts a downward force on the disc 44, which is transmitted by means of the stirrup 52 and the plate 54 to the guide member 49. The spring 59 thereupon yields, permitting the guide member 49 to move downwardly until the weight of the vessel is supported by the cooking surface 16. In the event that the bottom surface of the vessel is uneven, the heat shield 38 and the disc 44 are tilted slightly as required to ensure full positive contact with the vessel.

When the surface unit 10 is energized to initiate a cooking operation, the major portion of heat from the heater 14 will be sent upwardly into the vessel, chiefly by conduction and to a lesser extent by radiation and convection. As the temperature of the vessel rises, the temperature of the disc 44 also rises and since the vessel and the disc are in good heat conducting relation with each other, the disc will closely follow the temperature of the vessel. The resistor, being embedded within the tubular portion 46 of the disc and in good thermal relation therewith, will closely follow the temperature of the disc. Stray heat from the heater 14 is also emitted toward the temperature-responsive device 12 through and around the tubular spider member 19, the drip sleeve 66 and the insulating block 50. However, it will be noted that the cup-shaped heat shield 38 serves to intercept the stray heat thus emitted. Since the shield is made of metal of high thermal conductivity, it absorbs stray heat through its outer lower and side surfaces, such as the surface of its tubular wall 40 and the bottom and the outer vertical surface of the flange 41, and readily conducts the stray heat to the bottom wall of the vessel through the top or vessel contacting surface of the flange 41, thereby preventing excessive rise in the ambient surrounding the resistor and the disc.

The tubular portion 46 of the disc constitutes a thermal link or path providing good heat conduction, in either direction, between the insulation enclosing the resistor 42 and the upper part of the disc, and thereby aids in maintaining the temperature of the resistor 42 very close to the temperature of the top surface of the disc and the temperature of the adjacent surface of the vessel. Any residual stray heat reaching the tubular portion 46 and heat generated by flow of current through the resistor 42 is readily conducted upwardly to the vessel, so that the effect thereof on the resistor 42 is minimized.

The heat shield 38 is dimensioned in such a manner that the area of the vessel contacting surface of the annular flange 41 is substantially as large as the area of the outer surface of the tubular wall 40 of the heat shield. Thus, the stray heat will flow upwardly to the vessel and will not build up excessive temperature in the heat shield.

In the embodiment shown and described, it has been found by actual test that when the heating unit 14 is energized at continuous maximum wattage output for a period of three hours with a water containing vessel placed thereon, the temperature of the disc does not exceed 5° F. above the vessel temperature, while the temperature of the shield becomes stabilized at 40° F. above the vessel temperature. The low temperature rise of the shield is directly attributed to the rapid drain of stray heat from the heat shield into the vessel. The desired isolation of the resistor from the shield is preserved by the membrane 61 which, although in contact with the shield and the disc to protect the resistor from injury, prevents heat flow from the shield to the disc.

When the heating unit is operated in a less extreme manner, that is, at full wattage output for a period of ten minutes after the water in the vessel has begun to boil, the results are even more remarkable. Under these conditions, the temperature of the disc exceeds the vessel temperature by only 1° F. while the temperature of the shield exceeds the vessel temperature by only 5 to 10° F.

The upper portion of the temperature-responsive device 12 including the resistor 42, the shield 38 and the insulating block 50 form a unitary subassembly which may readily be detached as a unit from the surface unit 10. In the event that the device requires servicing in the field, the surface unit is first removed from the opening 11 in the range platform 22, whereupon the electrical circuit through the heater 14 is interrupted at the contacts 30, 32 and the circuit through the resistor is interrupted at the contacts 85, 87. The screws 80 which hold the cover 79 and the insulating block 50 to the spider are then removed. The upper portion of the temperature-responsive device may then be lifted out and repaired or replaced as required. As the upper portion of the device is lifted, the contacts 75 are simultaneously disengaged from the spring contacts 81.

I show another embodiment of my invention in Fig. 6, which is a fragmentary central section showing a temperature-responsive device 12'. The heating unit and the mounting arrangement of the device 12' therein are not shown, since they may be the same as in the first embodiment.

A cup-shaped heat shield 38' of material having good heat conducting properties and having a tubular wall 40' and an outwardly extending flange 41' is attached to the upper end of a tubular guide member 49'. The guide member 49' is slidably received in an insulating block 50' and the shield is biased upwardly by a helical spring 59' surrounding the guide member. Hence, the shield 38' is movable downwardly by the weight of a vessel or other utensil against the bias of the spring 59' in a manner similar to that of the first embodiment. Looseness of the fit between the guide member 49', the shield 38' and the block 50' permits slight tilting of the shield as required for maximum contact between the vessel and the shield at the upper surface of the flange 41'.

An annular heat insulating member 90 having a central vertical bore 91 is nested in the heat shield 38' and attached thereto in any desirable manner (not shown). The annular member 90 may be made of ceramic or other material having the desired heat insulating and temperature resisting properties and is of such a height that its upper surface is slightly below the upper surface of the flange 41' (1/32" has been found adequate).

A disc 44' of metal having good heat conducting qualities is slidably received in the bore 91 and is biased upwardly by a helical spring 92 of lesser spring force than spring 59'. The disc 44' and the annular member 90 are provided with cooperating annular flanges 93, 94 respectively, which limit the upper position of the disc 44' so that the upper or vessel-contacting surface of the disc is approximately 1/32" above the upper or vessel-contacting surface of the flange 41'.

The disc is provided with a depending central tubular portion 46'. A temperature-variable resistor 42' is received in the tubular portion 46' and is embedded therein by Silastic cement or the like. The resistor 42' has a pair of lead wires 71' which extend downwardly through the tubular guide members 49' and are provided with looped portions 95 which provide the required slack for vertical movement of the disc 44'.

The shield 38' has attached thereto at spaced points a tubular drip shield 66' which encompasses the insulating block 50' and prevents spillage from entering the inner confines of the shield and the block.

When a vessel is placed upon the temperature responsive structure 12', the bottom of the vessel will first contact the disc 44'. Since the spring 92 is more readily yieldable than the spring 59', the disc is moved downwardly until the full weight of the vessel is brought to bear upon the flange 41' of the heat shield. The heat shield 38' and the disc then move downwardly in unison, against the force of the spring 59', until further movement is arrested by the upper surface of the heating unit (not shown).

The area of the upper surface of the flange 41' is substantially as large as the area of the vertical portions of the shield, thereby permitting stray heat absorbed by the shield to flow readily into the vessel and minimizing rise in ambient temperature within the shield. The annular insulating member 90 serves to guide the disc 44' for vertical movement but also acts as a heat break between the shield and the disc, thereby further reducing heat flow from the shield to the disc and enabling the disc and its embedded resistor 42' to closely follow the temperature of the vessel.

The annular insulating member 90 fits snugly against the tubular wall 40' of the shield and the disc 44' is fitted to the bore 91 for a smooth sliding action with a minimum of side play. With this arrangement, possible damage to the resistor by spilled liquids is minimized, since flow into the bore of the annular member 90 is restricted, but is permitted to flow freely over the top of the structure and down the outer surface of the drip sleeve 66' without damage to the resistor or its leads.

Figs. 7 through 11 show modifications incorporated in a third embodiment of this invention, which relate to the mounting of the thermally responsive resistor or thermistor 142 within the temperature-responsive device and to the connections between the thermistor leads 171 and the insulated lead wires 173. The third embodiment is similar to the overall arrangement shown for the first embodiment in Figs. 1 through 5, except for the modifications appearing in Figs. 7 through 11.

In this embodiment, the thermistor 142 is supported in a disc 144 which is similar to the disc 44 of the first embodiment shown in Figs. 3 through 5, except that the recess in the tubular wall portion 146 extending from the lower side of the disc 144 has been modified slightly to receive the thermistor assembly. The disc 144 is adapted to be positioned in the same relation to the heat shield and the heating element as the disc 44, and is supported in the same manner by the stirrup 52 for vertical and slight tilting movement in the temperature-responsive device.

The thermistor is enclosed within the upper end of an electrically insulating two-piece shell 143—147, which is formed of ceramic material or the like, such as steatite, and secured within the tubular wall portion 146.

A high-temperature-resisting cement or paste 148, such as silicone rubber paste, embeds the thermistor in the upper end of the ceramic shell 143—147. The same paste may be used to secure the ceramic shell within the tubular wall portion.

The ceramic shell 143—147 comprises a cylindrical portion 147 and a cap 143. The cylindrical portion has a recess in the upper end thereof and two passageways 145 extend downwardly from the recess to the lower end. Formed integrally with this lower end and projecting laterally therefrom is a wire support 172. The cap 143 is of a hollow dome shape and has the same outside diameter as the cylindrical portion 147.

The thermistor lies in a chamber formed by the recess in the cylindrical portion 147 and the hollow cap 143. The thermistor leads 171 are embedded in the thermistor at their upper ends. These leads extend downwardly through the passageways 145 and in opposite directions along the lower side of the wire support 172. The leads 171 are connected to the exposed ends of the lead wires 173.

The two lead wires 173 lie side-by-side and extend in opposite directions beneath the lower flat face of the wire support 172 and their ends extend beyond the ends of the support. The portions of the lead wires 173 which lie beneath the support are tied to the support by means of a wire 174, preferably of heat resistant material such as nickel, which is wrapped about both the support and the lead wires. The portions of the securing wire 174 which pass over the wire support 172 on both sides of the cylindrical portion 147, as seen in Fig. 7, are held in parallel grooves 176. A heat resisting tape 178, such as a glass tape, may be wrapped about the wire leads 173, before tying them to the support, to prevent the securing wire 174 from cutting through the insulation on these leads.

Fig. 10 shows the lead wires and the components of the ceramic shell as they appear before assembly. The sequence of assembling the portions of the third embodiment shown in Fig. 10 will now be described. The thermistor is placed in the position indicated in the cylindrical portion 147 by passing its leads 171 through the passageways 145. These leads are seen extending in opposite directions along the underside of the wire support 172.

The assembly is continued by tying the lead wires 173 to the wire support in the manner shown in Figs. 7 through 9. The bare ends of the wires 173 and the thermistor leads 171 are then twisted together, soldered or welded, and then trimmed. The thermistor 142 and the upper end of the cylindrical portion 147 are then covered with the paste 148 and the cap 143 is put on. Additional paste is inserted in the recess in the tubular wall portion 146, and the ceramic shell 143—147 containing the thermistor is then pushed into the recess and held in this position while the assembly is heated for curing the paste.

The assembly of Fig. 7 is mounted on the plate 54 on the guide member 49, as seen in Fig. 11, by passing the lead wires 173 downwardly through the guide member 49 and bending over the tabs on the end of the plate 54 to secure the stirrup 52 to the plate. Loops are formed in the lead wires between the upper end of the guide member and the wire support 172 to permit flexing of these wires at this point. The lead wires are secured to the lower end of the guide member by the paste 148. In this assembly, the portions of the lead wires which extend above the paste can be flexed only by the slight tilting movement of the disc 144 relative to the stirrup 52.

The thermistor 142 is in good heat conducting relation to the wall portion 146, and the latter is in good heat conducting relation to the upper flat portion of the disc 144. Heat is readily transferred between the thermistor 142 and the disc 144 through the tubular wall portion 146 so that the thermistor temperature closely follows the temperature of the disc. The disc 144 is adapted to engage a cooking vessel in the same manner as disc 44, shown in Fig. 4, and closely follows the temperature thereof.

The ceramic shell 143—147 protects the thermistor 142 during assembly and ensures that each thermistor will be accurately positioned within the wall portion 146 of the disc so that more uniform thermal characteristics are obtained in production. Although the paste 148 is electrical insulating material, the shell ensures good electrical insulation between the thermistor 142 and the disc 144, thereby eliminating any electrical leakage which might otherwise result due to voids occurring in the paste.

When the shell 143—147 enclosing the thermistor is pushed into the wall portion 146, within which it fits closely, the cap 143 has practically no movement with respect to the cylindrical portion 147 of the shell. Thus, there will be little deformation of the paste which embeds the thermistor and the latter is not likely to be subjected to damaging stresses.

The lead wires 173 are tied to the wire support 172 to prevent the application of any undesired stresses on the relatively fragile thermistor leads or at the connections between the ends of these lead wires and the thermistor leads 171. Any tilting movement of the thermistor and disc assembly, shown in Fig. 7, relative to the stirrup 52, will flex only the looped portions of the lead wires 173 which lead away from the wire support 172. These lead wires 173 extend downwardly through the guide member 49, as seen in Fig. 11, and their lower ends are connected in the same manner as the lead wires 73 in Figs. 3 and 4.

To provide some appreciation of the size of the thermistor assembly and the fragility of the thermistor leads, it is pointed out that the subassembly shown in Fig. 9 is actually about one-quarter of an inch high and the cylindrical portion 147 is about one-eighth of an inch in diameter. The thermistor element 142 is about one twenty-fifth of an inch in diameter. The disc 144 is about one-half of an inch in diameter. These dimensions in no way are intended to limit the application of the features of this invention.

It will now be seen that my invention provides a relatively simple structure which may easily be disassembled for servicing and may as easily be assembled at the factory.

One of the main features of the invention is the manner in which the resistor is completely protected against damage which may normally be incurred in the usual operation of such a device. The resistor may be of the fragile thermistor type provided with extremely fragile leads without fear of damage in service. Also, the above ruggedness is attained without loss in thermal efficiency of the structure. In fact, as mentioned above, the thermal efficiency of the structure is such that exceptional results are attained under all normal surface cooking operations from simmering through boiling to frying.

It will also be seen that my solution of the stray heat problem is attained in a novel manner, and that instead of relying on means for preventing the stray heat from entering the thermo-responsive device, I direct the heat which flows into the heat shield by a good thermal path into the relatively large heat storage reservoir provided by the cooking vessel. With this arrangement, the temperature of the heat shield is prevented from rising excessively above the temperature of the cooking vessel and the ambient surrounding the resistor 42 is, accordingly, also prevented from rising excessively above the temperature of the vessel. The resistor is thus, for all practical purposes, influenced by heat from the vessel alone and follows its temperature closely.

While the invention has been shown in several forms, it will be obvious to those skilled in the art that it is not so limited, but is susceptible of other changes and modifications without departing from the spirit thereof.

What is claimed is:

1. In an electric surface heating unit comprising an electrical heater having a flat annular surface adapted to support a cooking vessel or the like, a temperature-responsive device supported in a central position in said heater, said device comprising a temperature-sensitive element, a cup-shaped heat shield having a tubular wall surrounding said element and defining an annular space therewith, said heat shield being composed of metal having good heat conducting properties and serving to thermally isolate said element from said electrical heater, an annular thermal insulating member bridging said annular space, said shield having an outwardly extending flange, means for biasing said shield and said temperature-sensitive element to positions in which at least a portion of said shield and of said element extend above said surface, whereby said outwardly extending flange and said temperature-sensitive element contact the bottom of said vessel, said shield and said flange being so constructed and adapted as to conduct most of the stray heat that is received by said tubular wall from said heater, from said wall to said flange and then to said vessel.

2. In an electric surface unit comprising an electrical heater forming a flat horizontal cooking surface of annular shape adapted to support a vessel, a temperature-responsive device supported in a central position in said heater, said device comprising a small temperature-sensitive element, a metal member having a flat upper surface portion of good thermal conductivity supporting said temperature-sensitive element and in good thermal relation therewith, a cup-shaped heat shield composed of metal of good thermal conductivity and having a tubular wall surrounding said member in spaced relation therewith, said shield having a peripheral vessel-engaging flange extending outwardly therefrom, said flange having a flat upper surface, means for loosely supporting said heat shield to permit tilting movement of the latter, means for biasing said heat shield to a position above the cooking surface of said heater, means for resiliently supporting said metal member in said heat shield, and a thermal insulating member of annular shape surrounding said metal member and extending to said tubular wall.

3. In an electric surface unit comprising an electrical heater forming a flat horizontal cooking surface of annular shape adapted to support a vessel, a temperature-responsive device supported in a central position in said heater, said device comprising a resistor whose resistance is variable with temperature, a metal member for supporting said resistor, said resistor supporting member having a flat upper surface and being made of metal having good thermal conductivity and having a bore in its lower portion, said resistor being received in said bore and disposed in good thermal relation with said resistor supporting member, a cup-shaped heat shield member composed of metal having good thermal conductivity and having a tubular wall surrounding said resistor supporting member in spaced relation therewith, said shield member having a peripheral vessel-engaging flange extending outwardly therefrom, said flange having a flat upper surface, means for loosely supporting said shield member to permit tilting movement of the latter, means for biasing said shield member to a position above the cooking surface of said heater, means for resiliently supporting said resistor supporting member in said shield member, and a thermal insulating member of annular shape bridging the space between said members and attached to one of said members.

4. In an electric surface heating unit comprising an electrical heater forming a flat horizontal cooking surface of annular shape adapted to support a vessel, a temperature-responsive device supported in a central position in said heater, said device comprising a small temperature-sensitive element, a metal member having a flat upper surface of good thermal conductivity supporting said temperature-sensitive element and in good thermal relation therewith, a cup-shaped heat shield composed of metal of good thermal conductivity and having a tubular wall surrounding said member in spaced relation therewith, said temperature-sensitive element being smaller than said member and having a pair of electrical lead wires extending downwardly through said shield, an annular membrane of heat resisting elastic material having its inner marginal portion attached to said member and its outer marginal portion attached to said shield and serving to seal the space between said shield and said member, whereby said lead wires and said temperature-sensitive element are protected from spillage and other foreign matter.

5. In an electric surface heating unit comprising an electrical heater forming a flat horizontal cooking surface of annular shape adapted to support a vessel, a temperature-responsive device supported in a central position in said heater, said device comprising a temperature-sensitive element, a flat metal member of good thermal conductivity supporting said temperature-sensitive element and in good thermal relation therewith, a heat shield having a tubular wall surrounding said member and said temperature-sensitive element and in spaced relation therewith, means for providing relative vertical movement between said member and said heat shield, an annular membrane of heat resisting rubber-like material having low thermal conducting properties, said membrane having its inner marginal portion attached to said member and its outer marginal portion attached to said heat shield and serving to seal the space between said heat shield and said member, whereby said temperature-sensitive element is protected from spillage and other foreign matter.

6. In a surface heating unit comprising a heater and having a surface adapted to support a cooking vessel or the like; a temperature-responsive device supported in a central position in said heater, said device comprising a temperature-sensitive element, a heat shield of good thermal conductivity surrounding said element and defining a space between said shield and said element, a thermal insulating member bridging said space to prevent the entry of any foreign matter between said element and said shield, said shield having a side wall and an upper flat surface, means for biasing said temperature-sensitive element and said shield upwardly to positions in which at least a portion of said element and of said shield extend above the supporting surface of said unit, said heat shield being so constructed and adapted as to conduct most of the stray heat received from said heating unit by said side wall to a cooking vessel in contact with said upper flat surface during a cooking operation.

7. In a surface heating unit comprising a heater and having a surface adapted to support a cooking vessel or the like, a temperature-responsive device adjacent said heater, said device comprising a temperature-sensitive electrical impedance element, a metal member of good thermal conductivity supporting said element in good thermal relation therewith and electrical insulated therefrom, means for supporting said member for vertical movement of at least a portion of said member above the plane of said supporting surface and for universal tilting movement of said member relative said surface, means biasing said member to a position in which at least a portion of said member extends above said supporting surface, electrical leads extending from said element, insulated lead wires connected to said leads, means for securing said insulated wires to said member to prevent the imposition of any damaging stresses on said leads or at the connections between said leads and said wires during said vertical and tilting movement of said member.

8. In a surface heating unit comprising a heater and having a flat horizontal surface adapted to support a vessel, a temperature-responsive device supported in a central position in said heater, said device comprising a resistor whose resistance is variable with the temperature, an electrically insulating ceramic shell for supporting and enclosing said resistor, a metal member for supporting said shell, said resistor being electrically insulated from said member, said supporting member being made of metal having good thermal conductivity and having a flat upper surface, said shell being attached in good thermal relation to the lower side of said supporting member, a heat shield surrounding said supporting member in spaced relation therewith, and means for biasing said supporting member to a position in which at least the flat upper surface thereof extends above said supporting surface.

9. In a surface heating unit comprising a heater and having a horizontal surface adapted to support a vessel, a temperature-responsive device supported in a central position in said heater, said device comprising a resistor whose resistance is variable with its temperature, an electrically insulating ceramic shell for supporting and enclosing said resistor, said shell comprising a lower resistor supporting portion having a recess in one end thereof to accommodate the resistor and a cap covering said recess to completely enclose said resistor, a metal member for supporting said shell, said supporting member being made of metal having good thermal conductivity and having a flat upper surface, said shell being attached in good thermal relation to the lower side of said supporting member, said resistor being electrically insulated from said member, a heat shield surrounding said supporting member in spaced relation therewith, and means for biasing said supporting member to a position in which at least the flat upper surface thereof extends above said horizontal surface.

10. A temperature-responsive device comprising a metal member having a surface adapted to engage a vessel whose temperature is to be sensed, said metal member being of good thermal conductivity, said metal member having a recess in the side opposite said surface, a temperature-responsive resistor having electrical leads connected thereto, an electrically insulating member supporting said resistor within said recess in good thermal relation to said metal member, said resistor being electrically insulated from said metal member lead wires connected to said leads, means for securing said wires to said insulating member to prevent the application of any damaging stresses to said leads through said wires.

11. A temperature-responsive device comprising a temperature-sensing element having a surface adapted to engage a vessel whose temperature is being sensed, a heat shield of good thermal conductivity surrounding said element in spaced relation therewith, said heat shield being adapted to engage said vessel when said element engages said vessel, means for supporting said element for movement relative said shield, and a flexible thermally insulating member connected to said shield and to said element to seal the space therebetween to prevent the entry of any foreign matter.

12. A temperature-sensing device comprising a metal member having a surface adapted to engage a vessel whose temperature is to be sensed, said member being of good thermal conductivity, said member having a recess in the side opposite said surface, a temperature-responsive resistor having electrical leads connected thereto, an electrically insulating shell enclosing said resistor and supporting said resistor in said recess in good thermal relation to said member, said resistor being electrically insulated from said member lead wires connected to said leads, means for securing said wires to said shell to prevent the application of any damaging stresses to said leads by said wires during use of said device.

13. A temperature-responsive device comprising a temperature-sensitive element, a metal member of good thermal conductivity supporting said temperature-sensitive element and in good thermal relation therewith, a heat shield having a tubular wall surrounding said member and said temperature-sensitive element and in spaced relation therewith, means for providing relative movement between said member and said heat shield, an annular membrane of heat resisting flexible material having low thermal conducting properties, said membrane being supported and disposed with its inner marginal portion against said member and its outer marginal portion against said heat shield and serving to prevent entry of liquid and other foreign matter between said heat shield and said member.

References Cited in the file of this patent

UNITED STATES PATENTS

| | | |
|---|---|---|
| 947,914 | Junkers | Feb. 1, 1910 |
| 2,500,061 | Clark | Mar. 7, 1950 |
| 2,534,097 | Akeley | Dec. 12, 1950 |
| 2,602,132 | Young | July 1, 1952 |
| 2,699,487 | Turner | Jan. 11, 1955 |
| 2,727,975 | Molyneaux et al. | Dec. 20, 1955 |